Patented Mar. 13, 1928.

1,662,396

UNITED STATES PATENT OFFICE.

ALFRED E. PARMELEE, OF CARNEYS POINT, NEW JERSEY, ASSIGNOR TO E. I. DU PONT DE NEMOURS & COMPANY, OF WILMINGTON, DELAWARE, A CORPORATION OF DELAWARE.

PRODUCTION OF BETA-NAPHTHOL-1-SULPHONIC ACID.

No Drawing.   Application filed March 4, 1924. Serial No. 696,899.

This invention relates to the production of beta-naphthol-1-sulphonic acid. More particularly it relates to a method of producing this acid such that not only are high yields obtained but also the mechanical inconveniences, and other difficulties of previous methods are avoided. It is the object of the invention to provide such a method. Briefly stated, the invention comprises the sulphonation of beta-naphthol with sulphur trioxide while the beta-naphthol is carried in a suspension medium (including under this term any material, solvent or non-solvent which serves as a suitable vehicle) which is essentially unreactive at the temperature at which the reaction is carried out.

The ordinary practice for the production of beta-naphthol-1-sulphonic acid has been to treat beta-naphthol with 90–93% sulphuric acid at ordinary temperatures. The product of the interaction of beta-naphthol and sulphuric acid is a mixture of the mono-sulphonic acids of beta-naphthol; and the yield of beta-naphthol-1-sulphonic acid is but about 70% of the theoretical. Furthermore, this method has, in addition to its fault of low yield, many mechanical inconveniences because of the stiff pasty nature of the resulting reaction product. As another method of producing this acid, it is possible, as mentioned in the literature, to convert beta-naphthol to beta-naphthol-1-sulphonic acid by allowing chlorosulphonic acid to react with a suspension of beta-naphthol in carbon disulphide. This process is, however, difficult to carry out because, unless prohibitively large amounts of carbon disulphide are used, the reaction mass is so stiff that a proper mixing of the ingredients is impossible. Also the inflammability of carbon disulphide is an objectional feature. And in addition to these objections the yield of beta-naphthol-1-sulphonic acid is but 60–70% of the theoretical.

While it is true that the disadvantages of the above methods can be easily overcome by the method set forth by me in my United States application 694,013 filed Feb. 20, 1924, entitled Production of beta-naphthol-1-sulphonic acid, in accordance with which method the beta-naphthol is suspended in o-nitrotoluene and the sulphonation effected by the addition of chlorosulphonic acid, yet the use of chlorosulphonic acid is in itself, however, not completely satisfactory because of the many precautions necessary in handling it and because it is quite expensive when compared to other sulphonating agents. The present method while avoiding the difficulties of prior methods at the same time obviates the use of chlorosulphonic acid and with it yields of 80 to 85% are possible.

The present invention comprises in particular the sulphonation of beta-naphthol, in nitro-benzene, o-nitrotoluene, benzene, toluene, solvent naphtha, or any other suspension medium which is essentially inactive at the temperature at which the reaction is carried out, by reaction therewith, at a temperature preferably below 16° C., of a solution of sulphur trioxide, preferably in the form of fuming sulphuric acid containing 60 to 65% free sulphur trioxide. Working in this way the disadvantages above indicated, and various other disadvantages, are readily and satisfactorily overcome, the use of sulphur trioxide as the sulphonating agent eliminating those disadvantages without the introduction of other objectionable features.

Without restricting the invention thereto the following is given as an example of practice in accordance with the method:—

Into any suitable closed pot provided with vent, means for the slow regular introduction of fuming sulphuric acid, mechanical agitation, means for ascertaining temperatures and jacketed to permit cooling with refrigerated brine, are charged 144 g. of beta-naphthol and 400 g. of mono-nitrobenzene. The resulting mixture is cooled to 0° C. and there are then run in 135 g. of fuming sulphuric acid containing 65% free sulphur trioxide. The acid should be run in at such a rate that the addition requires 3 hours. The charge is then stirred 1–3 hours. The temperature should be maintained below 15° C. during the whole time. At the completion of the reaction the mixture in the pot is drowned in 1 liter of water and the mono-nitro-benzene separated from the aqueous solution of the naphthol sulphonic acids. This aqueous solution is neutralized with an alkali carbonate or hydroxide such as potassium carbonate and the alkali metal salt of beta-naphthol-1-sulphonic acid, such as the potassium salt, is salted out by the addition of the corresponding chloride. The separated alkali salt of the beta-naphthol-1-sulphonic acid is filtered off.

It will be understood that, while I have, in giving the above example, referred to mono-nitrobenzene, to fuming sulphuric acid containing 65% free sulphur trioxide, and to potassium salt, the invention is not confined to these particular materals: for any suitable suspension medium such as o-nitrotoluene, benzene, toluene, etc. may be used; also fuming sulphuric acid containing more or less than 65% free sulphur trioxide or even a solution of sulphur trioxide in nitrotoluene or benzene may be used; and also there may be used sodium salts or any other salt which can be separated from aqueous solution by precipitating or by the ordinary means of salting out with which all chemists are familiar. It will likewise be understood that the amounts of materials employed and the temperature used may be varied within reasonable limits.

As suggested previously, in referring to "suspension medium" I use the terms "suspended", "suspension" and the like to refer not only to suspension proper but also to solution, considering the latter for present purposes as a particular type of suspension.

I claim:

1. The process of making beta-naphthol-1-sulphonic acid which comprises acting upon beta naphthol, suspended in an essentially inert liquid substance, with a solution of sulphur trioxide, at a temperature below 16° C.

2. The process of making beta-naphthol-1-sulphonic acid which comprises acting upon beta naphthol, suspended in a nitro-hydrocarbon, with a solution of sulphur trioxide, at a temperature below 16° C.

3. The process of making beta-napthol-1-sulphonic acid which comprises acting upon beta naphthol, suspended in an essentially inert liquid substance, with fuming sulphuric acid, at a temperature below 16° C.

4. The process of making beta-naphthol-1-sulphonic acid which comprises acting upon beta naphthol, suspended in a nitro-hydrocarbon, with fuming sulphuric acid, at a temperature below 16° C.

5. The process of making beta-naphthol-1-sulphonic acid which comprises acting upon beta naphthol, suspended in a nitro-hydrocarbon, at a temperature below 16° C. with 60–65% fuming sulphuric acid.

6. The process of making beta-naphthol-1-sulphonic acid which comprises acting upon beta-naphthol, suspended in an essentially inert liquid substance, with a solution of sulphur trioxide, at a temperature below 16° C., and separating the beta-naphthol-1-sulphonic acid from the inert substance.

7. The process of making beta-naphthol-1-sulphonic acid which comprises acting upon beta naphthol, suspended in mono-nitro-benzene, with 60 to 65% fuming sulphuric acid, at a temperature below 16° C. drowning in water, separating the mono-nitro-benzene, adding a neutralizing alkali compound, and salting out the beta-naphthol-1-sulphonic acid salt.

In testimony whereof I affix my signature.

ALFRED E. PARMELEE.